United States Patent
Chen et al.

(10) Patent No.: US 9,639,399 B2
(45) Date of Patent: May 2, 2017

(54) METHOD, APPARATUS AND TERMINAL FOR RELEASING MEMORY

(71) Applicant: TENCENT TECHNOLOGY (SHENZHEN) COMPANY LIMITED, Shenzhen (CN)

(72) Inventors: Zebin Chen, Shenzhen (CN); Haifeng Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 180 days.

(21) Appl. No.: 14/246,222

(22) Filed: Apr. 7, 2014

(65) Prior Publication Data
US 2014/0223134 A1 Aug. 7, 2014

Related U.S. Application Data

(63) Continuation of application No. PCT/CN2014/071336, filed on Jan. 24, 2014.

(30) Foreign Application Priority Data

Feb. 1, 2013 (CN) .......................... 2013 1 0041078

(51) Int. Cl.
G06F 9/50 (2006.01)
G06F 12/02 (2006.01)

(52) U.S. Cl.
CPC .......... *G06F 9/5016* (2013.01); *G06F 9/5022* (2013.01); *G06F 12/0223* (2013.01); *G06F 2212/70* (2013.01)

(58) Field of Classification Search
None
See application file for complete search history.

(56) References Cited

U.S. PATENT DOCUMENTS 7,503,044 B2 3/2009 Chew
9,152,549 B1 * 10/2015 Kesselman ........... G06F 12/023
(Continued)

FOREIGN PATENT DOCUMENTS

CN 101833512 A 9/2010

OTHER PUBLICATIONS

The World Intellectual Property Organization (WIPO) International Search Report for PCT/CN2014/071336 Apr. 30, 2014.
(Continued)

*Primary Examiner* — Jared Rutz
*Assistant Examiner* — Charles Choi
(74) *Attorney, Agent, or Firm* — Anova Law Group, PLLC (57) ABSTRACT

A method is provided for memory releasing. The method includes obtaining a first memory space value of a terminal system, where the first memory space represents a size of current idle memory space on the terminal system. The method also includes requesting a memory space whose size equals to a second memory space value from the terminal system, where the second memory space value is greater than the first memory space value. Further, the method includes releasing occupied memory after the terminal system receives a memory space request and detects that the second memory space value is greater than the first memory space value. The method includes confirming allocation of the memory space whose size equals to the second memory space value. The method includes releasing the memory space whose size equals to the second memory space value as the idle memory space after receiving allocation confirmation of the memory space of the terminal system.

17 Claims, 4 Drawing Sheets

(56) References Cited

U.S. PATENT DOCUMENTS

| | | | |
|---|---|---|---|
| 2003/0056076 A1* | 3/2003 | Cook .................... | G06F 9/5016 |
| | | | 711/173 |
| 2004/0268078 A1* | 12/2004 | Hassan ................ | G06F 9/5016 |
| | | | 711/170 |
| 2006/0085787 A1 | 4/2006 | Breslaw | |
| 2010/0088480 A1* | 4/2010 | Hu ...................... | G06F 12/0246 |
| | | | 711/161 |
| 2010/0274947 A1* | 10/2010 | Ohta .................. | G06F 9/45558 |
| | | | 711/6 |
| 2012/0260058 A1* | 10/2012 | Matsuzaki ............ | G06F 9/5016 |
| | | | 711/171 |
| 2013/0067193 A1* | 3/2013 | Kagan ................ | G06F 12/1081 |
| | | | 711/206 |
| 2013/0088501 A1* | 4/2013 | Fell ...................... | G06F 12/023 |
| | | | 345/543 |
| 2013/0262812 A1* | 10/2013 | Lefebvre ............... | G06F 12/023 |
| | | | 711/171 |

OTHER PUBLICATIONS

The State Intellectual Property Office of the People's Republic of China (SIPO) Office Action 1 for 201310041078.3 Dec. 12, 2014.

* cited by examiner

METHOD, APPARATUS AND TERMINAL FOR RELEASING MEMORY

CROSS-REFERENCES TO RELATED APPLICATIONS

This application is a continuation application of PCT Patent Application No. PCT/CN2014/071336, filed on Jan. 24, 2014, which claims priority of Chinese Patent Application No. 201310041078.3, filed on Feb. 1, 2013, the entire contents of which are incorporated by reference herein.

FIELD OF THE INVENTION

The present invention generally relates to computer technologies and, more particularly, to a method, apparatus and terminal for releasing memory.

BACKGROUND

With the rising popularity of mobile terminals, applications on terminals are becoming increasingly diverse. Although terminal functions are enhanced, a lot of memory space on the terminal can be occupied by applications, thereby causing a slower terminal processing speed. In order to save the terminal memory usage and improve the processing speed of the terminal, the memory space occupied by application programs that have not been used for a long time need to be released.

In existing technologies, a third party application program of a terminal obtains memory space that is occupied by currently running application programs and calls a system API (Application Programming Interface) to close at least one program that has not been used for long time. Therefore, the memory space that is occupied by the at least one application program can be released.

However, such techniques may have certain limitations. For example, some operating systems set calling permission for the APIs. If the third party application program does not have calling permission for the API, the third party application program cannot call the API and release the memory space of a terminal. For instance, some APIs of Apple's operating system are clearly defined as private APIs and are not made available to public. The third party application program cannot call the private API to release the memory space of the terminal, thereby limiting the efficiency of the existing methods.

The disclosed method, apparatus and terminal are directed to solve one or more problems set forth above and other problems.

BRIEF SUMMARY OF THE DISCLOSURE

One aspect of the present disclosure includes a method for releasing memory. The method includes obtaining a first memory space value of a terminal system, where the first memory space represents a size of current idle memory space on the terminal system. The method also includes requesting a memory space whose size equals to a second memory space value from the terminal system, where the second memory space value is greater than the first memory space value. Further, the method includes releasing occupied memory after the terminal system receives a memory space request and detects that the second memory space value is greater than the first memory space value. The method includes confirming allocation of the memory space whose size equals to the second memory space value. The method includes releasing the memory space whose size equals to the second memory space value as the idle memory space after receiving allocation confirmation of the memory space of the terminal system.

Another aspect of the present disclosure includes an apparatus for releasing memory. The apparatus includes a first obtaining module configured to obtain a first memory space value of a terminal system, where the first memory space value represents a size of current idle memory space on the terminal system. The apparatus also includes a request module configured to request a memory space whose size equals to a second memory space value from the terminal system, where the second memory space value is greater than the first memory space value; after the terminal system receives the memory space request and detects that the second memory space value is greater than the first memory space value, the terminal system releases occupied memory; and after the occupied memory is released, the terminal system confirms allocation of the memory space whose size equals to the second memory space value. Further, the apparatus includes a releasing module configured to, after receiving allocation confirmation of the memory space of the terminal system, release the memory space whose size equals to the second memory space value requested by the request module.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions of the present invention, the figures which are needed to be used in the description of the present invention or the existing technology are briefly described in the following. Obviously, the figures in the following description are only some embodiments of the present invention, and it is easily for those skilled in the art to obtain other figures based on the following figures without creative work.

DETAILED DESCRIPTION

Reference will now be made in detail to exemplary embodiments of the invention, which are illustrated in the accompanying drawings.

Figure 1:
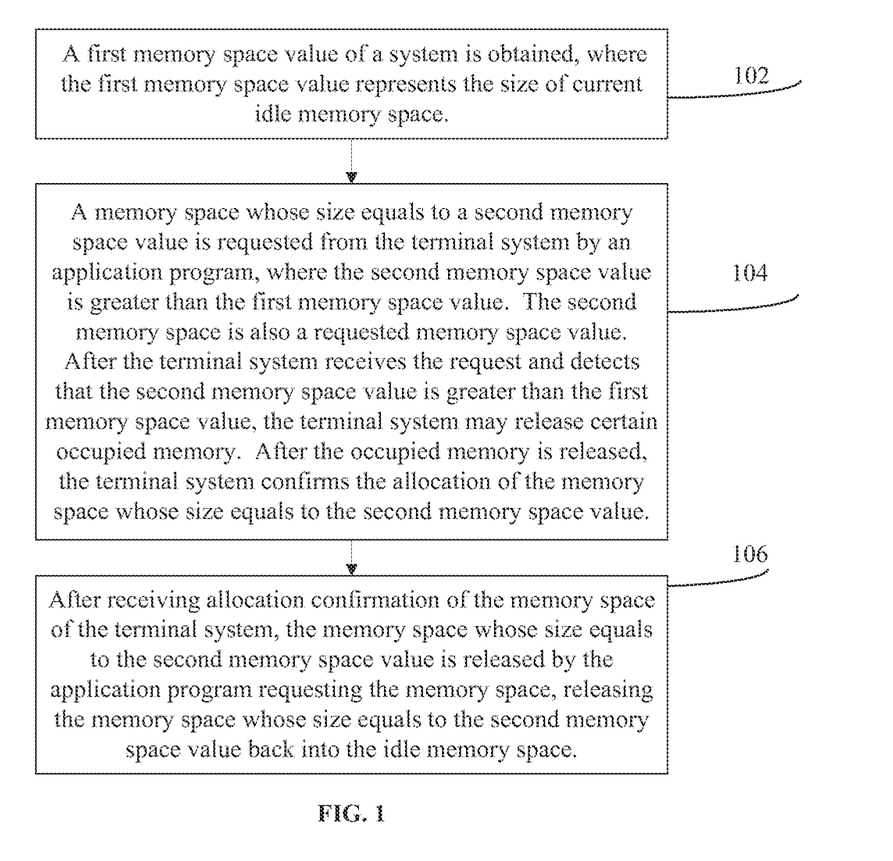
FIG. 1 illustrates a flow chart of an exemplary memory releasing process performed on a terminal system consistent with the disclosed embodiments.

FIG. 1 illustrates a flow chart of an exemplary memory releasing process performed on a terminal system consistent with the disclosed embodiments. The memory releasing process may be applied to a terminal.

The terminal may refer to any appropriate user terminal with certain computing capabilities, such as a personal computer (PC), a work station computer, a server computer, a hand-held computing device (tablet), a smart phone or mobile phone, or any other user-side computing device. In certain embodiments, terminal may be a wireless terminal, such as a smart phone, a tablet computer, or a mobile phone, etc.

Figure 5:
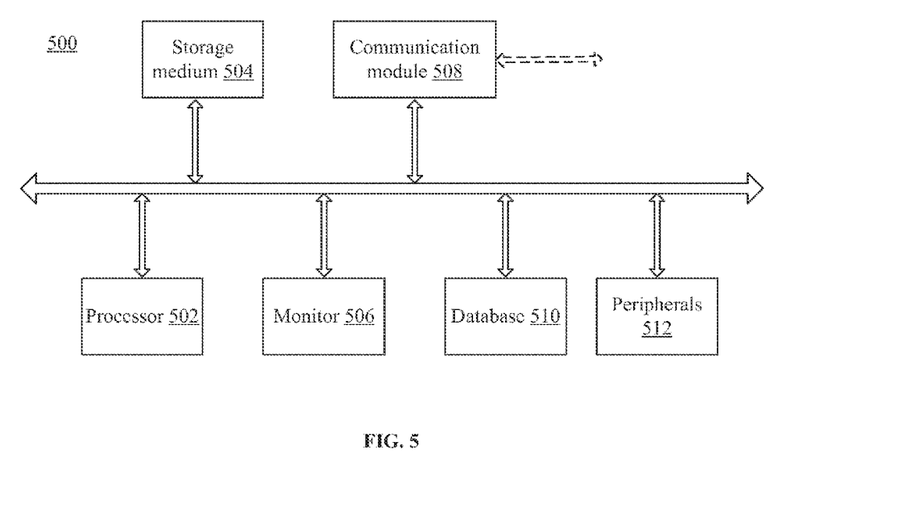
FIG. 5 shows a block diagram of an exemplary computing system capable of implementing a terminal system according to the disclosed embodiments.

The terminal may be implemented on any appropriate computing platform. FIG. 5 shows a block diagram of an exemplary computer system 500 capable of implementing terminal.

As shown in FIG. 5, computer system 500 may include a processor 502, a storage medium 504, a monitor 506, a communication module 508, a database 510, and peripherals 512. Certain devices may be omitted and other devices may be included.

Processor 502 may include any appropriate processor or processors. Further, processor 502 can include multiple cores for multi-thread or parallel processing. Storage medium 504 may include memory modules, such as ROM, RAM, flash memory modules, and erasable and rewritable memory, and mass storages, such as CD-ROM, U-disk, and hard disk, etc. Storage medium 504 may store computer programs for implementing various processes, when executed by processor 502.

Further, peripherals 512 may include I/O devices such as keyboard and mouse, and communication module 508 may include network devices for establishing connections through a communication network, such as a wireless network or a wired network. Database 510 may include one or more databases for storing certain data and for performing certain operations on the stored data, such as database searching.

In operation, the terminal may run a plurality of user application programs, as well as certain Internet based applications. The user applications programs may include third party application programs capable of calling the operating system of the terminal to perform certain functions, such as an improved memory releasing function.

Referring to FIG. 1, the memory releasing process may include the following steps.

Step 102: a first memory space value of a terminal system is obtained, where the first memory space value represents the size of current idle memory space on the terminal system.

Information stored in the idle memory space is treated as invalid, because the idle memory space may be used by application programs at any time. The first memory space value is also an idle memory space value.

Step 104: a memory space whose size equals to a second memory space value is requested from the terminal system by an application program, where the second memory space value is greater than the first memory space value. The second memory space is also a requested memory space value. After the terminal system receives the request and detects that the second memory space value is greater than the first memory space value, the terminal system may release certain occupied memory. After the occupied memory is released, the terminal system confirms the allocation of the memory space whose size equals to the second memory space value.

Memory allocation is a process by which computer application programs are assigned with physical or virtual memory space by the operating system. Once the application program has finished its operation or is idle, the memory space is released and allocated to another application program.

Specifically, the memory space whose size equals to the second memory space value is requested from the terminal system by the application program, where the second memory space value is greater than the first memory space value. After the terminal system (e.g., the operating system) detects that the first memory space value is not large enough for allocating memory with size of the second memory space value, the terminal system may release some memory space occupied by current programs. The released memory space is added to the idle memory space. Then, the first memory space value of the terminal system is re-calculated after some memory space is released. The terminal system detects whether the re-calculated first memory space value is greater than the second memory space value. If it is detected that the re-calculated first memory space value is greater than the second memory space value, the terminal system confirms allocation of the memory space whose size equals to the second memory space value.

Step 106: after receiving allocation confirmation of the memory space of the terminal system, the memory space whose size equals to the second memory space value is released by the application program requesting the memory space, releasing the memory space whose size equals to the second memory space value back into the idle memory space.

Specifically, after receiving allocation confirmation of the memory space of the terminal system, the memory space whose size equals to the second memory space value as allocated by the terminal system is obtained and released, further expanding the idle memory space of the terminal system and increasing the processing speed of the terminal.

Thus, a memory releasing method is provided in present disclosure. A first memory space value of a terminal system is obtained. A memory space whose size equals to a second memory space value is requested from the terminal system. The second memory space value is greater than the first memory space value. After receiving allocation confirmation of the memory space of the terminal system, the memory space whose size equals to the second memory space value is released, making the memory space whose size equals to the second memory space value as idle memory space. The method solves the problem that the third-party application program cannot release memory space of the terminal if the third party application program does not have permission to call an application program interface (API) for memory releasing, therefore expanding the scope of use for memory releasing method and improving the processing speed of the terminal.

Figure 2:
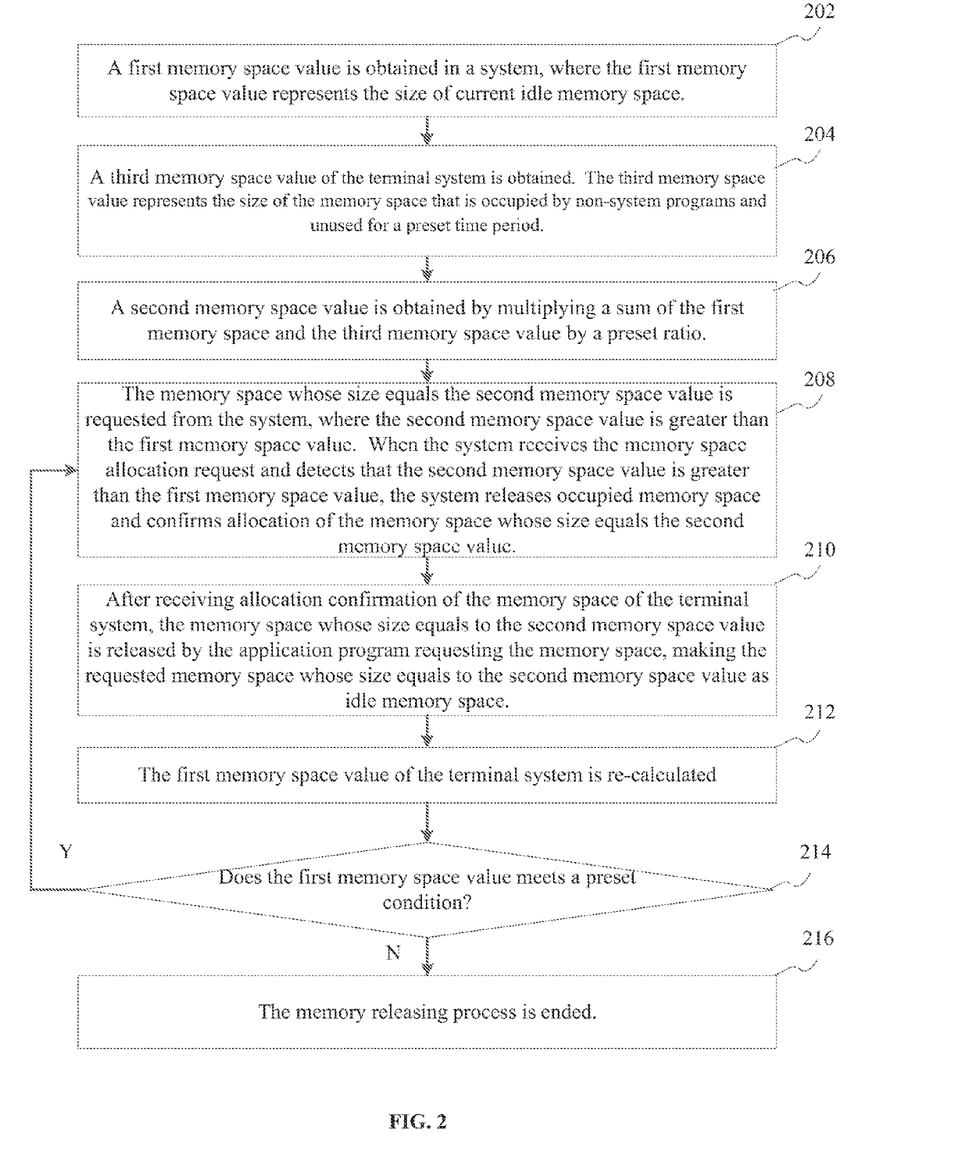
FIG. 2 illustrates a flow chart of another exemplary memory releasing process performed on a terminal system consistent with the disclosed embodiments.

FIG. 2 illustrates a flow chart of another exemplary memory releasing process performed on a terminal system consistent with the disclosed embodiments. The memory releasing method may be applied to a terminal. The terminal may be a smart TV, a smart mobile phone, or a tablet computer, etc. As shown in FIG. 2, the memory releasing process includes the following steps.

Step 202: a first memory space value of a terminal system is obtained, where the first memory space value represents the size of current idle memory space on the terminal system.

The memory space may be used to store data that needs to be operated on when programs run. When no data is stored in the memory space or the data stored in the memory space is invalid, the memory space is in idle status. The idle memory space can be allocated to application programs at any time by the operating system.

As used herein, the terminal system (e.g., the operating system) computes in real-time the first memory space value of the idle memory space (i.e., in the idle state). Thus, the first memory space value may be obtained by a read operation.

Step 204: a third memory space value of the terminal system is obtained. The third memory space value represents the size of the memory space that is occupied by non-system programs and unused for a preset time period.

As used herein, the status of memory space of the terminal system may also include occupancy state. The occupancy state indicates that the memory space is used to store data to be operated when an application program runs. The memory space in occupancy state cannot be used directly by other programs. But the memory space in occupancy state can be allocated to other programs after the operated data is stored and the memory space is set to idle state.

Further, the programs can be divided into system programs and non-system programs. The system programs are system kernels (e.g., an operating system, compiler, or utility program) that control some aspect of the operation of a computer. Because releasing memory used by the system programs will result in system crashes, the memory space that is occupied by system programs cannot be released. Non-system programs are programs that are installed by users and are used to enhance terminal applications (i.e., application programs). Releasing memory used by non-system programs does not affect system operations. Therefore, the memory space that is occupied by non-system programs can be released.

Optionally, the non-system programs can be divided into programs that are not used for a preset time period and programs that are used for the present time period. The programs that are used for a preset time period can be further divided into programs that are currently used and programs that are not currently used. When releasing the memory space, the terminal system can preferentially release the memory space that is occupied by the application programs that are not used for the preset time period. Then, the terminal system releases the memory space that is occupied by application programs that are used for a preset time period but are not used currently, further expanding the memory space in the idle state. The terminal system does not release the programs that are currently used, avoiding impact on users caused by closing recently opened non-system programs. The terminal system may determine the application programs to be released through time and/or frequency.

Specifically, after the terminal system determines application programs that have not been used for a preset time period, the terminal system computes a third memory space value of the memory space occupied by these application programs. The third memory space value can be obtained through a read operation.

Step 206: a second memory space value is obtained by multiplying a sum of the first memory space and the third memory space value by a preset ratio.

As used herein, the second memory space value is the size of the memory space that needs to be requested from the terminal system, i.e., the requested memory space value. If the second memory space value is too small, the terminal system can allocate the memory space whose size equals to the second memory space value from the idle memory space whose size equals to the first memory space value, no desired result can be achieved. Therefore, the second memory space value needs to be greater than the first memory space value.

On the other hand, if the second memory space value is too large, after the terminal system allocates the memory space whose size equals to the second memory space value, the terminal system may send a low memory warning due to high memory usage. If a total number of warnings that are sent out by the terminal system exceed a preset number, the terminal system may force the application program that requests the memory space from the terminal system to close. Therefore, the second memory space value needs to be smaller than the difference between a total memory space and the memory space that is not allowed to release.

Further, the memory space that is not allowed to release includes at least the memory space occupied by system programs and the memory space occupied by application programs that are currently used. Therefore, the memory space value of the memory space that is not allowed to release is smaller or equals to the sum of a fourth memory space value of the memory space occupied by system programs and a fifth memory space value of the memory space occupied by currently used non-system programs for a preset time period. That is, the second memory space value<(total memory space value−the fourth memory space value−the fifth memory space value)=(the first memory space value+the third memory space value). Thus, the second memory space value can be selected from the range between the first memory space value and the sum of the first memory space value and the third memory space value.

Optionally, before obtaining the second memory space value by multiplying the sum of the first memory space value and the third memory space value by a preset ratio, the number of low memory warnings sent out by the terminal system is also obtained. And the preset ratio is derived based on the obtained first memory space value, the obtained third memory space value and the obtained number of low memory warnings.

To obtain a desired preset ratio, multiple trials can be performed for the combination of the first memory space value, the third memory space value and the number of low memory warnings. For example, during a trial, if the current second memory space value causes the number of low memory warnings sent out by the terminal system to exceed a preset number, or causes the terminal system to force the application program requesting memory space to close, the second memory space value is decreased. The trial can be performed again until the number of low memory warnings sent out by the terminal system is less than the preset number. The ratio of the second memory space value with respect to the sum of the first memory space value and the third memory space value is then calculated, that is, the preset ratio. Subsequently, this preset ratio can be used to calculate the second memory space value to achieve a desired effect, preventing the terminal system from forcing the application program requesting memory space to shut down.

Step 208: the memory space whose size equals to the second memory space value is requested from the terminal system, where the second memory space value is greater than the first memory space value. When the terminal system receives the memory space allocation request and detects that the second memory space value is greater than the first memory space value, the terminal system releases occupied memory space and confirms allocation of the memory space whose size equals to the second memory space value.

Specifically, the memory space whose size equals to the second memory space value is requested from the terminal system, wherein the second memory space value is greater than the first memory space value. When the terminal system detects that the memory space whose size equals to the first memory space value is not large enough for allocation, the terminal system releases the memory space that is occupied by current programs and releases the cleaned memory space as idle memory space. After the memory space is released, the first memory space value of the terminal system is re-calculated. The terminal system detects whether the re-calculated first memory space value is greater than the second memory space value. If the terminal system detects that the re-calculated first memory space value is greater than the second memory space value, the terminal system confirm allocation of the memory space whose size equals to the second memory space value. In general, the size of the idle memory space after releasing occupied memory space is greater than the second memory space value.

Furthermore, the memory space whose size equals to the second memory space value can be requested from the terminal system through multiple processes. If the terminal system limits the size of the memory space that can be requested by each process, more than one process can be set in the application program that is used for requesting the memory space, thereby expanding the size of the memory space that can be requested. For example, if the terminal system limits the memory space value of the memory space that is allowed to request for each process to 20 MB, through setting n processes in the application program, where n≥1, the total memory space that is allowed to request from the terminal system can be 20 n MB. If n=3, 60 MB memory space can be requested; if n=5, 100 MB memory space can be requested; and so on.

Step 210: after receiving allocation confirmation of the memory space of the terminal system, the memory space whose size equals to the second memory space value is released by the application program requesting the memory space, making the requested memory space whose size equals to the second memory space value as idle memory space.

Specifically, after receiving allocation confirmation of the memory space of the terminal system, the memory space whose size equals to the second memory space value is released by the application program into the idle memory space, further expanding the size of idle memory space of the terminal system, improving the processing speed of the terminal.

Step 212: the first memory space value of the terminal system is re-calculated.

Optionally, after the memory space whose size equals to the second memory space value is released, the first memory space value of the terminal system is re-calculated. At this point, the re-calculated first memory space value equals to the sum of the size of the released memory space and the previous first memory space value. Based on the re-calculated first memory space value, the terminal system detects whether the operation for releasing the memory space is still needed.

Step 214: whether the first memory space value meets a preset condition is detected. If it is detected that the first memory space value meets the preset condition, Step 208 is performed again; otherwise, Step 216 is performed.

That is, based on the re-calculated first memory space value, the terminal system detects whether further memory space releasing is still needed. If it is detected that memory space releasing needs to be continued, Step 208 is performed. If it is detected that memory space releasing does not needed, the memory space releasing process is ended. Before performing Step 208 again, however, the second memory space value also needs to be re-calculated.

The preset condition may include at least one of two conditions: the first memory space value is less than a preset first threshold value and the difference between the re-calculated first memory space value and the previous obtained first memory space value is greater than a preset second threshold value. For example, if the first memory space value is less than the preset first threshold value, the memory space releasing process continues; if the difference between the re-calculated first memory space value and the previous obtained first memory space value is greater than the preset second threshold value, the memory space releasing process continues; if the first memory space value is less than the preset first threshold value and the difference between the re-calculated first memory space value and the previous obtained first memory space value is greater than the preset second threshold value, the memory space releasing process continues. Other preset conditions may also be used.

For example, the first threshold value can be preset as 20 MB. If the re-calculated first memory space value is 25 MB, it is detected that the first memory space value is greater than the preset first threshold value. At this point, the memory releasing process is ended. If the re-calculated first memory space value is 18 MB, it is detected that the first memory space value is less than the preset first threshold value. At this point, the memory space releasing process continues to be operated. The first threshold value can be set and modified, and other threshold values can be used.

Also for example, the second threshold value can be preset as 1 MB. If the previous obtained first memory space value is 5 MB and the re-calculated first memory space value is 7 MB, it is detected that the difference between the re-calculated first memory space value and the previous obtained first memory space value is greater than the preset second threshold value. At this point, Step 208 is performed again. If the previous obtained first memory space value is 5 MB and the re-calculated first memory space value is 5.5 MB, it is detected that the difference between the re-calculated first memory space value and the previous obtained first memory space value is less than the preset second threshold value. At this point, the memory releasing process is ended. The second threshold value can be set and modified, and other threshold values can be used.

Step 216: the memory releasing process is ended.

The above described process may be used on any appropriate mobile terminals and/or mobile operating systems. For example, under the iOS operating system on a mobile terminal such as iPhone, four types of memory space may be classified by the iOS operating system. The memory space is divided into free memory, wired memory, active memory, and inactive memory.

Free memory is the amount of memory space that's not being used. The wired memory is used by the operation system and can't be released. The active memory is used by currently running applications. The inactive memory was used by recently closed application programs, which allows them to reopen quickly. That is, if a user uses these recently closed application programs again, the speed of accessing the application programs from the inactive memory is faster than loading the application programs from disk.

An application program may be provided to detect the amount of inactive memory and the amount of free memory, and to request a temporary memory space whose size is close to the sum of the free memory and the inactive memory, making the system instantly out of memory. The accurate amount of the temporary memory space may be determined based on the preset ratio properly derived.

Out of memory is a state of computer operation (often undesired) where no additional free memory can be allocated for use by application programs or the operating system. When the mobile terminal is out of memory, the mobile terminal operating system releases the inactive memory as the free memory. Further, if part of the active memory is unused, the mobile terminal may change the unused partial active memory into the inactive memory and eventually releases it as free memory for the application programs to use. That is, the mobile terminal can release temporarily unused memory or kill the unused applications that are running in the background.

Further, the percentage of the sum of the inactive memory and the free memory with respect to the total memory space is calculated, and the application program repeats the above steps. After each repeat, when the mobile phone system detects that the percentage of the sum of the inactive memory and the free memory with respect to the total memory space is over a certain threshold, or the sum of the inactive memory and the free memory does not increase, the application program stops repeating the above steps.

Finally, the application program releases all requested temporary memory space, achieving the effect of releasing memory for improving the processing speed of the mobile terminal.

Thus, a memory releasing method is provided in present disclosure. A first memory space value of a terminal system is obtained. A memory space whose size equals to a second memory space value is requested from the terminal system. The second memory space value is greater than the first memory space value. After receiving the allocation confirmation of the memory space of the terminal system, the memory space whose size equals to the second memory space value is released by the application program, making the memory space whose size equals to the second memory space value as the idle memory space. Thus, the problem that the third-party application cannot release memory space of the terminal if the third party application does not have permission to call an application program interface (API) can be solved, expanding the scope of use for memory releasing method and improving the processing speed of the terminal. In addition, a third memory space value is obtained, and the second memory space value can be obtained by multiplying the sum of the first memory space value and the third memory space value by a preset ratio. Thus, multiple memory space requests caused by inaccurate second memory space value can be avoided, improving the efficiency of the memory releasing method.

Figure 3:
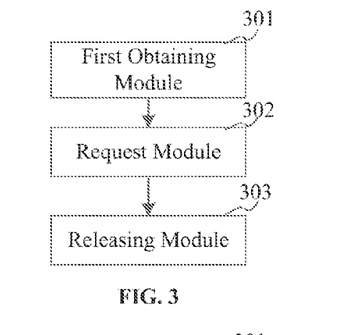
FIG. 3 illustrates a structure diagram of an exemplary memory releasing apparatus consistent with the disclosed embodiments.

FIG. 3 illustrates a structure diagram of an exemplary memory releasing apparatus consistent with the disclosed embodiments. The memory releasing apparatus may be used in a terminal. The terminal may be a smart TV, a smart mobile phone, or a tablet computer, etc. As shown in FIG. 3, the memory releasing apparatus includes a first obtaining module 301, a request module 302, and a releasing module 303.

The first obtaining module 301 is configured to obtain a first memory space value of a terminal system. The first memory space value represents the size of current idle memory space on the terminal system.

The request module 302 is configured to request a memory space whose size equals to a second memory space value from the terminal system. The second memory space value is greater than the first memory space value. When the terminal system receives the memory space request and detects that the second memory space value is greater than the first memory space value, the terminal system releases certain occupied memory. Then, the terminal system confirms allocation of the memory space whose size equals to the second memory space value.

The releasing module 303 is configured to, after receiving allocation confirmation of the memory space, release the memory space whose size equals to the second memory space value requested by the request module 302. Therefore, the memory space whose size equals to the second memory space value becomes the idle memory space.

Figure 4:
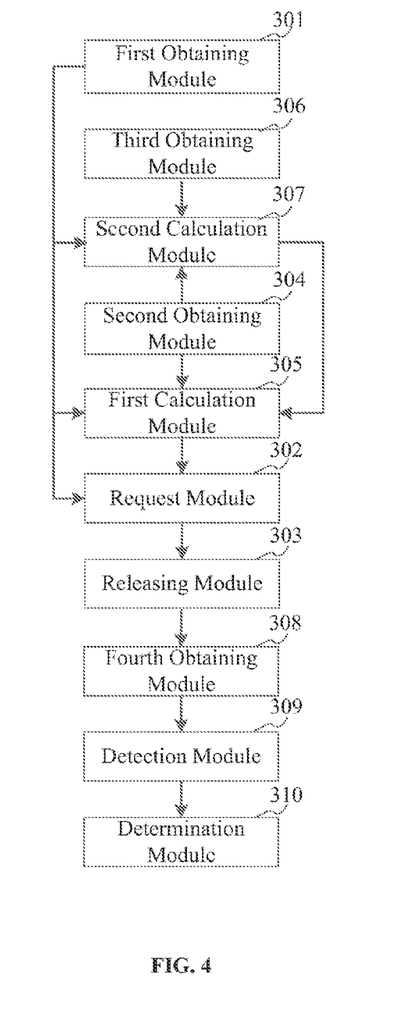
FIG. 4 illustrates a structure diagram of another exemplary memory releasing apparatus consistent with the disclosed embodiments.

FIG. 4 illustrates a structure diagram of another exemplary memory releasing apparatus consistent with the disclosed embodiments. The memory releasing apparatus may be used in a terminal. The terminal may be a smart TV, a smart mobile phone, or a tablet computer, etc. As shown in FIG. 4, the memory releasing apparatus includes a first obtaining module 301, a request module 302, and a releasing module 303.

The first obtaining module 301 is configured to obtain a first memory space value of a terminal system. The first memory space value represents the size of current idle memory space on the terminal system.

The request module 302 is configured to request a memory space whose size equals to a second memory space value from the terminal system. The second memory space value is greater than the first memory space value. When the terminal system receives the request and detects that the second memory space value is greater than the first memory space value, the terminal system releases the occupied memory. Then, the terminal system confirms allocation of the memory space whose size equals to the second memory space value.

The releasing module 303 is configured to, after receiving allocation confirmation of the memory space, release the memory space whose size equals to the second memory space value requested by the request module 302. Therefore, the memory space whose size equals to the second memory space value becomes the idle memory space.

Further, the memory releasing apparatus may also include a second obtaining module 304 and a first calculation module 305.

The second obtaining module 304 is configured to, before the request module 302 requests the memory space whose size equals to the second memory space value from the terminal system, obtain a third memory space value. The third memory space value represents the size of the memory space that is and occupied by unused non-system programs for a preset time period.

The first calculation module 305 is configured to obtain the second memory space value by multiplying a sum of the first memory space value and the third memory space value by a preset ratio, where the first memory space value is obtained by the first obtaining module 301, and the third memory space value is obtained by the second obtaining module 304.

Further, the memory releasing apparatus may also include a third obtaining module 306, a second calculation module 307, and a fourth obtaining module 308.

The third obtaining module 306 is configured to, before the first calculation module 305 obtains the second memory space value by multiplying the sum of the first memory space value and the third memory space value by the preset ratio, obtain the number of low memory warnings that are sent out from the terminal system.

The second calculation module 307 is configured to obtain a preset ratio based on the first memory space value obtained by the first obtaining module 301, the third memory space value obtained by the second obtaining module 304, and the number of low memory warnings obtained by the third obtaining module 306.

The fourth obtaining module 308 is configured to, after the releasing module receives the allocation confirmation of the memory space and releases the memory space whose size equals to the second memory space value, re-obtain the first memory space value of the terminal system.

Further, the memory releasing apparatus may also include a detection module 309 and a determination module 310.

The detection module 309 is configured to detect whether the first memory space value re-calculated by the fourth obtaining module 308 meets a preset condition.

The determination module 310 is configured to, after the detection module detects that the first memory space value re-calculated by the fourth obtaining module 308 meets the preset condition, determine that the memory space whose size equals to the second memory space value from the terminal system is requested again.

The preset condition includes at least one of two conditions: the first memory space value is less than a preset first threshold value; the difference between the re-calculated first memory space value and the previous obtained first memory space value is greater than a preset second threshold value.

Thus, a memory releasing apparatus obtains a first memory space value of a terminal system. The memory releasing apparatus requests a memory space whose size equals to a second memory space value from the terminal system. The second memory space value is greater than the first memory space value. After receiving the allocation confirmation of the memory space of the terminal system, the memory releasing apparatus releases the memory space whose size equals to the second memory space value, making the memory space whose size equals to the second memory space value as the idle memory space. The method solves the problem that third party application cannot release memory space of the terminal if the third party application does not have permission to call an application program interface (API) for memory releasing, therefore expanding the scope of use for memory releasing method and improving the processing speed of the terminal. In addition, a third memory space value is obtained. Then the second memory space value can be obtained by multiplying the sum of the first memory space value and the third memory space value by a preset ratio. Thus, multiple memory space requests caused by inaccurate second memory space values can be avoided, improving the efficiency of releasing memory.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed method and apparatus for memory releasing, a first memory space value of a terminal system is obtained. A memory space whose size equals to a second memory space value is requested from the terminal system. The second memory space value is greater than the first memory space value. After receiving allocation confirmation of the memory space of the terminal system, the memory space whose size equals to the second memory space value is released, making the memory space whose size equals to the second memory space value as idle memory space. The method solves the problem that the third-party application program cannot release memory space of the terminal if the third party application program does not have permission to call an application program interface (API) for memory releasing, therefore expanding the scope of use for memory releasing method and improving the processing speed of the terminal.

What is claimed is:

1. A method for releasing memory, comprising:
   obtaining, by an application program without requesting permissions from a system kernel level API (Application Programming Interface) controlling memory releasing in a terminal system, a first memory space value of the terminal system, wherein the first memory space value represents a total size of current idle memory space on the terminal system, and the application program is a user-installed non-system program;
   requesting, by the application program, a memory space whose size equals to a second memory space value from the terminal system, wherein the second memory space value is greater than the first memory space value;
   after receiving the memory space request and detecting that the second memory space value is greater than the first memory space value, releasing, by the terminal system, certain occupied memory;
   confirming, by the terminal system, allocation of the memory space whose size equals to the second memory space value;
   receiving, by the application program, the allocation of the memory space directed to the application program from the terminal system, wherein a size of the allocation equals to the second memory space; and
   after receiving allocation confirmation of the memory space of the terminal system, releasing, by the application program, the memory space whose size equals to the second memory space value allocated for the application program into the current idle memory space,
   wherein before requesting the memory space whose size equals to the second memory space value from the terminal system, the method further comprises:
   identifying system programs and non-system programs, wherein system programs are kernel level programs that control an operation of the terminal system, and non-system programs are user-installed programs that do not control system operations;
   obtaining a third memory space value, wherein the third memory space value represents a memory space that is occupied by non-system programs and unused for a preset time period; and
   obtaining the second memory space value by multiplying a sum of the first memory space value and the third memory space value by a preset ratio, wherein the preset ratio is determined according to the first memory space and the third memory space, to produce a multiplication result greater than the first memory space value.

2. The method according to claim 1, further including:
obtaining a total number of low memory warnings sent out from the terminal system; and
obtaining the preset ratio based on the first memory space value, the third memory space value, and the number of low memory warnings.

3. The method according to claim 2, further including:
performing multiple trials for setting the preset ratio based on the first memory space value, the third memory space value and the number of low memory warnings.

4. The method according to claim 3, wherein:
when the number of low memory warnings sent out by the terminal system exceeds a preset number, the terminal system forces the program that requests memory space from the terminal system to close; and
when the number of low memory warnings sent out by the terminal system is less than the preset number, the preset ratio is calculated by the second memory space value with respect to the sum of the first memory space value and the third memory space value.

5. The method according to claim 1, wherein:
the memory space whose size equals to the second memory space value is requested from the terminal system through multiple processes configured in a program that is used for requesting the memory space, when the terminal system limits the size of the memory space that can be requested by each process.

6. The method according to claim 1, after receiving allocation confirmation of the memory space of the terminal system and releasing the memory space whose size equals to the second memory space value, further including:
re-calculating the first memory space value of the terminal system;
detecting that the re-calculated first memory space value meets a preset condition; and
when the re-calculated first memory space value meets the preset condition, requesting the memory space whose size equals to the second memory space value from the terminal system again.

7. The method according to claim 6, wherein the preset condition includes at least one of two conditions:
the re-calculated first memory space value is less than a preset first threshold value; and
the difference between the re-calculated first memory space value and the previous obtained first memory space value is greater than a preset second threshold value.

8. An apparatus for releasing memory, comprising one or more processors executing an application program to release memory, the one or more processors being configured to:
obtain a first memory space value of a terminal system without requesting permissions from a system kernel level API (Application Programming Interface) to release memory space in the terminal system, wherein the first memory space value represents a total size of current idle memory space on the terminal system, and the application program is a user-installed non-system program;
request a memory space whose size equals to a second memory space value from the terminal system; wherein:
the second memory space value is greater than the first memory space value;
after the terminal system receives the memory space request and detects that the second memory space value is greater than the first memory space value, the terminal system releases certain occupied memory; and
after the occupied memory is released, the terminal system confirms allocation of the memory space whose size equals to the second memory space value;
receive, from the terminal system, the allocation of the memory space directed to the application program, wherein a size of the allocation equals to the second memory space; and
after receiving allocation confirmation of the memory space of the terminal system, release the memory space whose size equals to the second memory space value allocated for the application program into the current idle memory space;
wherein the one or more processors are further configured to execute the application program to: before the application program requests the memory space whose size equals to the second memory space value from the terminal system,
identify system programs and non-system programs, wherein system programs are kernel-level programs that control an operation of the terminal system, and non-system programs are user-installed programs that do not control system operations; and
obtain a third memory space value, wherein the third memory space value represents a size of a memory space that is occupied by non-system programs and unused for a preset time period; and
obtain the second memory space value by multiplying a sum of the first memory space value and the third memory space value by a preset ratio, wherein: the preset ratio is determined according to the first memory space and the third memory space, to produce a multiplication result greater than the first memory space value.

9. The apparatus according to claim 8, wherein the one or more processors are further configured to execute the application program to:
before the application program obtains the second memory space value, obtain a total number of low memory warnings sent out from the terminal system; and
obtain the preset ratio based on the first memory space value, the third memory space value and the number of low memory warnings.

10. The apparatus according to claim 9, wherein the one or more processors are further configured to:
perform multiple trials for setting the preset ratio based on the first memory space value, the third memory space value and the number of low memory warnings.

11. The apparatus according to claim 10, wherein:
when the number of low memory warnings sent out by the terminal system exceeds a preset number, the terminal system forces the program that requests memory space from the terminal system to close; and
when the number of low memory warnings sent out by the terminal system is less than the preset number, the preset ratio is calculated by the second memory space value with respect to the sum of the first memory space value and the third memory space value.

12. The apparatus according to claim 9, wherein the one or more processors are further configured to execute the application program to:

after the application program receives allocation confirmation of the memory space of the terminal system and releases the memory space whose size equals to the second memory space value, re-calculate the first memory space value of the terminal system;

detect that the re-calculated first memory space value meets a preset condition; and after the application program detects that the re-calculated first memory space value meets the preset condition, determine that the memory space whose size equals to the second memory space value from the terminal system is requested again.

13. The apparatus according to claim 12, wherein the preset condition includes at least one of two conditions:

the re-calculated first memory space value is less than a preset first threshold value; and the difference between the re-calculated first memory space value and the previous obtained first memory space value is greater than a preset second threshold value.

14. The apparatus according to claim 8, wherein:

the application program requests a memory space whose size equals to a second memory space value from the terminal system through multiple processes configured in a program that is used for requesting the memory space, when the terminal system limits the size of the memory space that can be requested by each process.

15. A terminal for memory releasing, comprising:

an apparatus for releasing memory, wherein the apparatus includes one or more processors configured to execute an application program to:

obtain a first memory space value of a terminal system of the terminal without requesting permissions from a system kernel level API (Application Programming Interface) to release memory space in the terminal system, wherein the first memory space value represents a total size of current idle memory space on the terminal system, and the application program is a user-installed non-system program;

request a memory space whose size equals to a second memory space value from the terminal system; wherein:

the second memory space value is greater than the first memory space value;

after the terminal system receives the memory space request and detects that the second memory space value is greater than the first memory space value, the terminal system releases certain occupied memory; and after the occupied memory is released, the terminal system confirms allocation of the memory space whose size equals to the second memory space value;

receive, from the terminal system, the allocation of the memory space directed to the application program, wherein a size of the allocation equals to the second memory space; and after receiving allocation confirmation of the memory space of the terminal system, release the memory space whose size equals to the second memory space value allocated for the application program into the current idle memory space;

wherein the one or more processors of the apparatus are further configured to execute the application program to: before the application program requests the memory space whose size equals to the second memory space value from the terminal system, identify system programs and non-system programs, wherein system programs are kernel-level programs that control an operation of the terminal system, and non-system programs are user-installed programs that do not control system operations; and obtain a third memory space value, wherein the third memory space value represents a size of a memory space that is occupied by non-system programs and unused for a preset time period; and obtain the second memory space value by multiplying a sum of the first memory space value and the third memory space value by a preset ratio, wherein: the preset ratio is determined according to the first memory space and the third memory space, to produce a multiplication result greater than the first memory space value.

16. The terminal according to claim 15, wherein the one or more processors of the apparatus are further configured to execute the application program to:

before the application program obtains the second memory space value, obtain a total number of low memory warnings sent out from the terminal system; and obtain the preset ratio based on the first memory space value, the third memory space value and the number of low memory warnings.

17. The terminal according to claim 16, wherein the one or more processors of the apparatus are further configured to execute the application program to:

after the application program receives allocation confirmation of the memory space of the terminal system and releases the memory space whose size equals to the second memory space value, re-calculate the first memory space value of the terminal system;

detect that the re-calculated first memory space value meets a preset condition; and after the application program detects that the re-calculated first memory space value meets the preset condition, determine that the memory space whose size equals to the second memory space value from the terminal system is requested again.

\* \* \* \* \*